INVENTOR.
ROY H. SPIES
BY GEORGE L. N. MEYER
John W. Michael
ATTORNEY

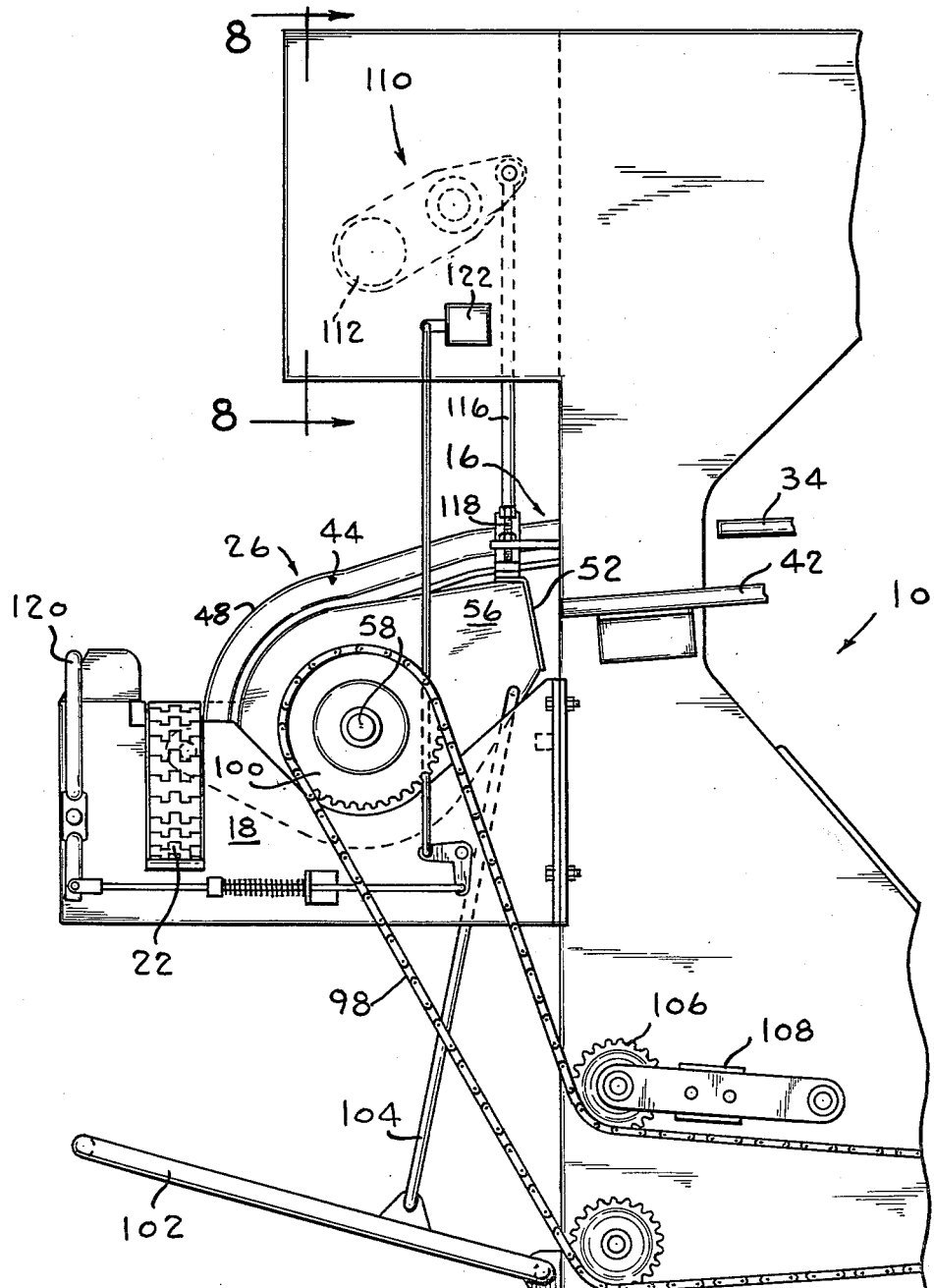

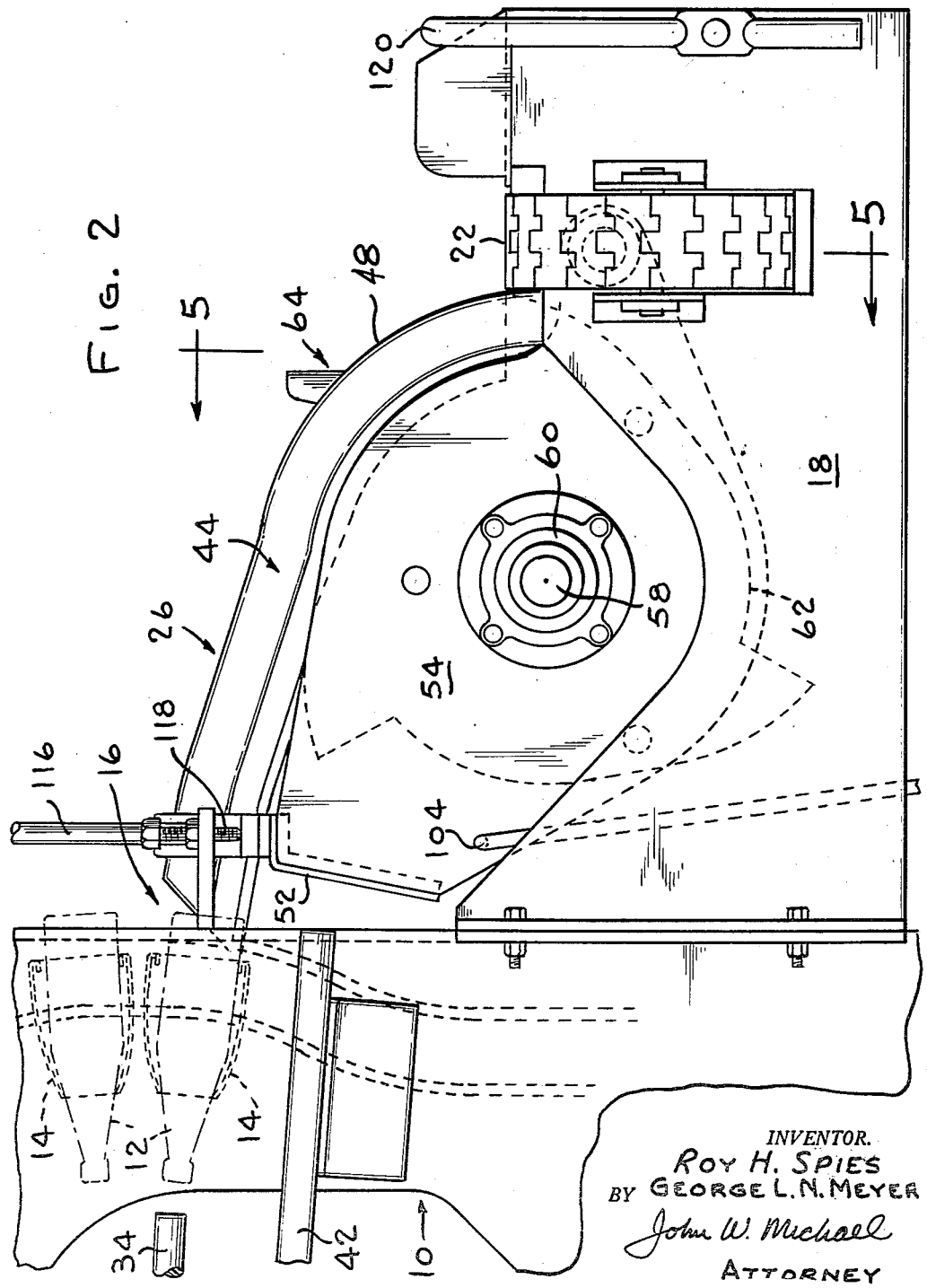

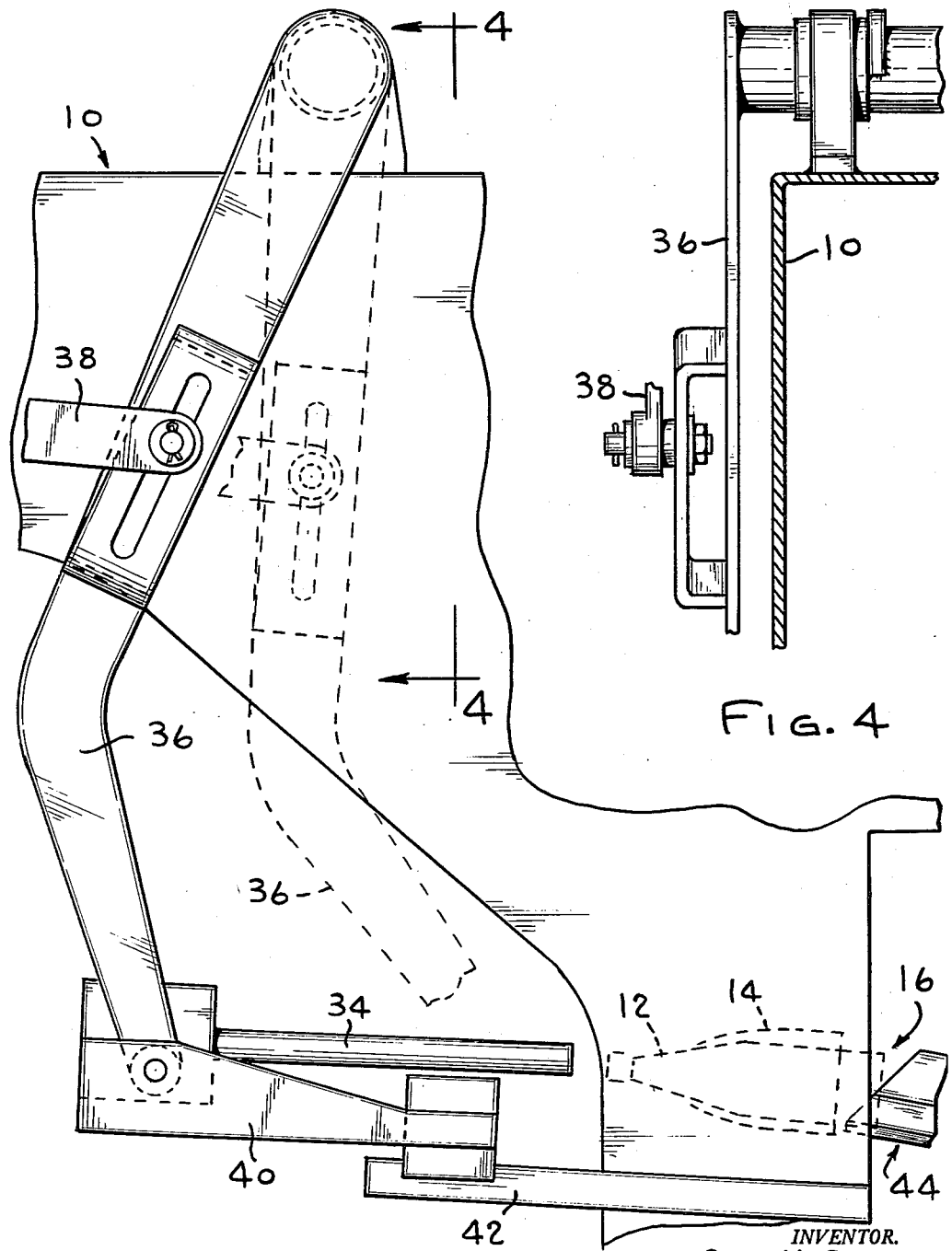

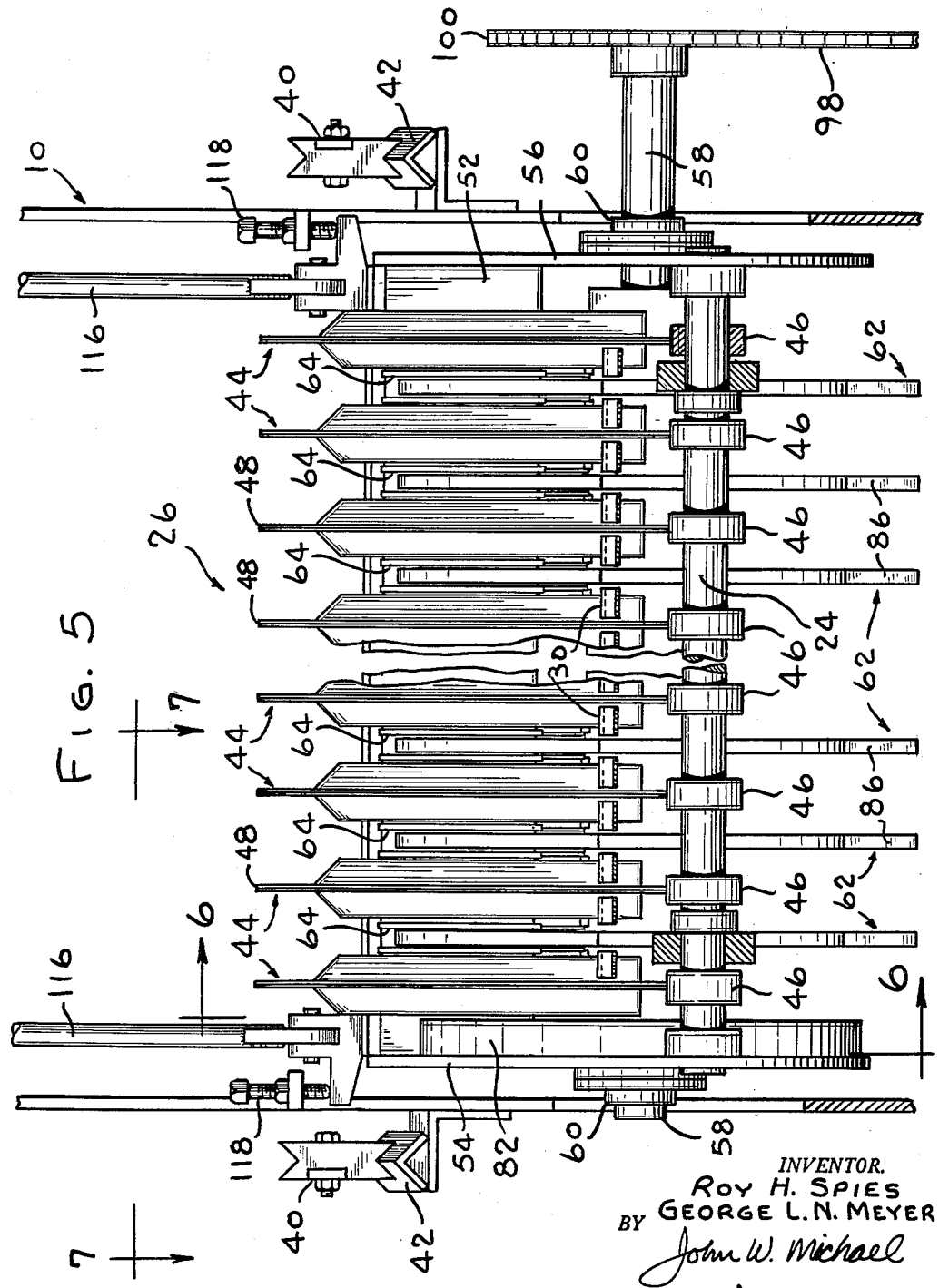

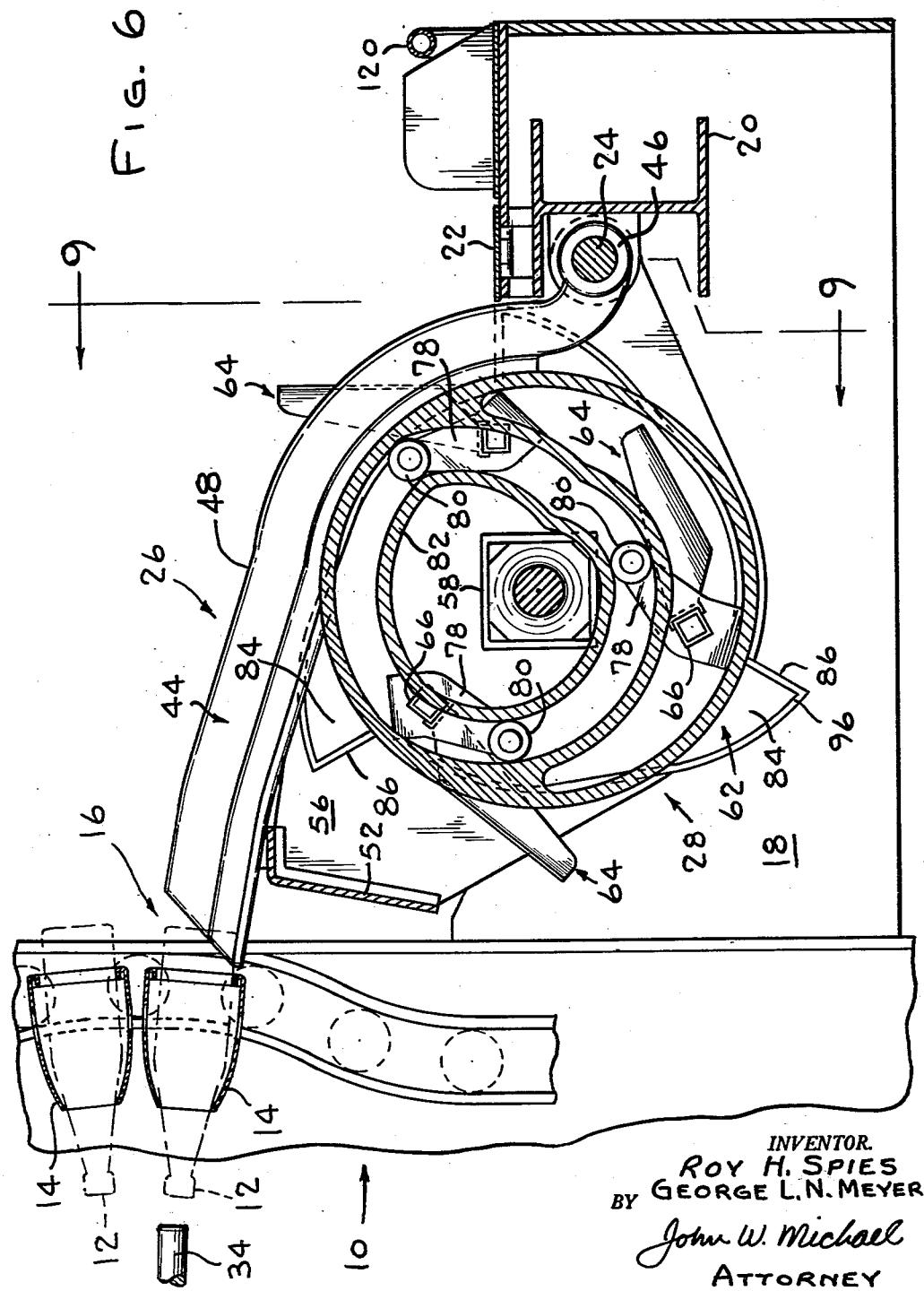

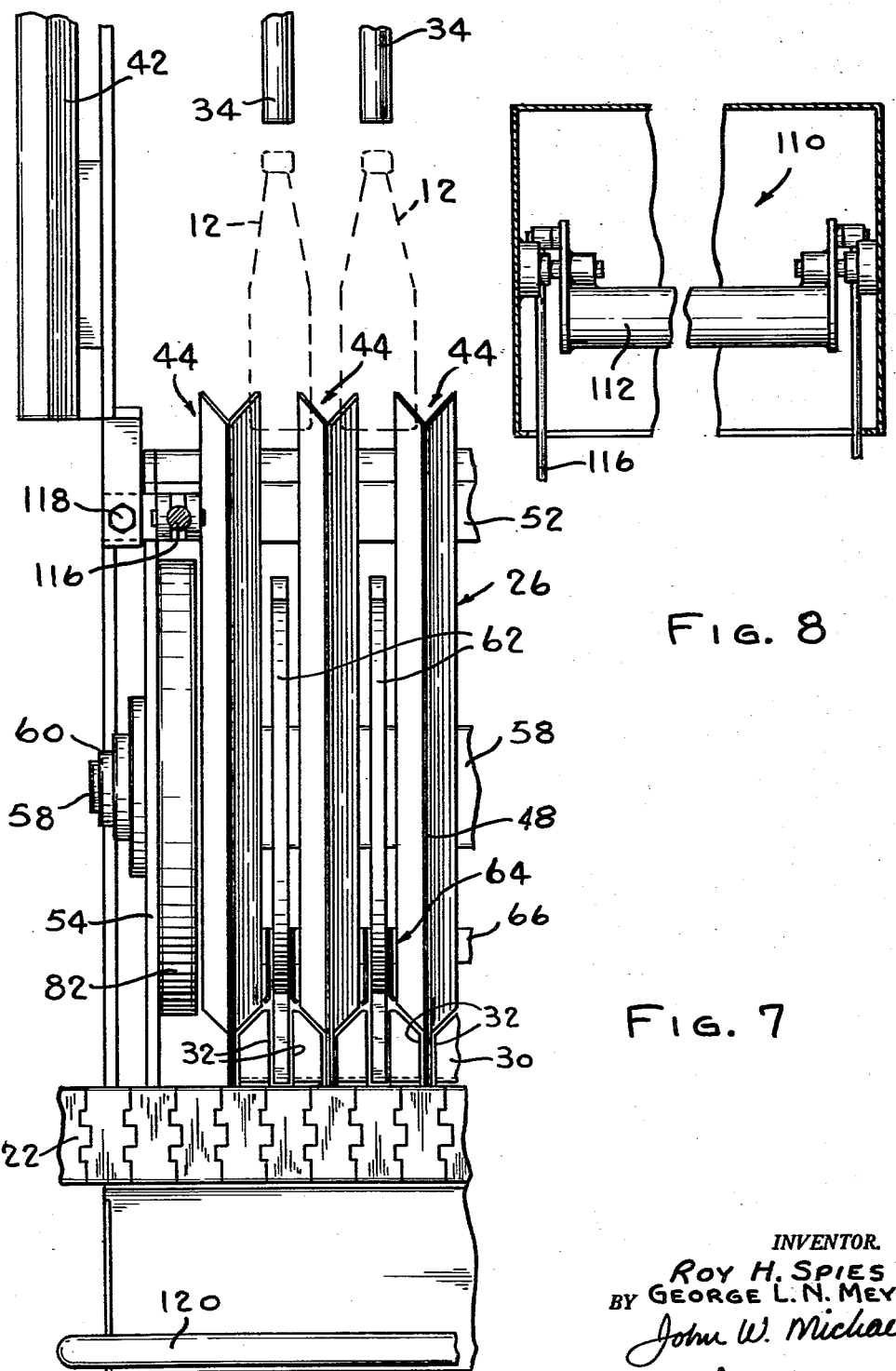

INVENTOR.
ROY H. SPIES
BY GEORGE L. N. MEYER
John W. Michael
ATTORNEY 3,110,387
Patented Nov. 12, 1963

3,110,387
BOTTLE HANDLING APPARATUS
George L. N. Meyer and Roy H. Spies, Milwaukee, Wis., assignors to Geo. J. Meyer Manufacturing Co., Cudahy, Wis., a corporation of Wisconsin
Filed May 18, 1961, Ser. No. 111,011
19 Claims. (Cl. 198—25)

This invention relates generally to bottle handling apparatus and more particularly to apparatus for unloading bottles from a bottle washer and transferring them to a conveyor.

Prior to this invention the most widely practiced method of unloading bottles from a washer utilized a reciprocating apparatus of one type or another. Such reciprocating unloaders are inherently limited both in bottle handling capacity and in smoothness of handling. It is one object of this invention, therefore, to provide an unloader having a continuously rotating movement to increase capacity while still maintaining smooth and gentle handling.

A further consideration in apparatus of this type is the ejection angle of the bottles from the washer carriers and the relative speed of the rotating unloader mechanism with respect to the bottle handling capacity of such mechanism. In this regard it is desirable that the unloader be capable of handling bottles which are ejected from the carriers in a substantially horizontal position to prevent the possibility of dripping into the open ends of the washed bottles while still in the washer. It is also desirable that the relative rotation of the apparatus with respect to its bottle handling capacity be kept to a minimum, to thereby keep the velocity of the bottles at a minimum to prevent tipping when the bottles are deposited in upright position. It is a further object of this invention, therefore, to provide a rotating unloader which is adapted to receive horizontally ejected bottles and which rotates at a relatively slow rate with respect to its bottle handling capacity.

The bottle handling apparatus of this invention is designed specifically for unloading bottles from the carriers of a bottle washer onto a discharge conveyor. Briefly stated, the apparatus includes a bottle guide means adapted to receive a row of bottles in substantially horizontal position from the carriers of the bottle washer. A bottle transfer means is provided to engage the row of bottles on the guide means and deposit them in upright position on a horizontal bottle slide plate located between the bottle guide means and the discharge conveyor. The bottle transfer means includes a plurality of rotatable cam members each having three bottle support faces and three push-off faces formed thereon. With this arrangement, three rows of bottles can be unloaded for each revolution of the rotatable cam members. Bottle tilter fingers are pivotally mounted adjacent each of the cam members and cooperate with each bottle support face to engage the side and bottom of a bottle, respectively, to thereby support and steady the bottle as it is transferred along the guide means for deposit on the slide plate. The bottle push-off face on the cam is adapted to engage a bottle after it has been deposited on the slide plate and push it horizontally from the plate towards the discharge conveyor.

Other objects and advantages will be pointed out in, or be apparent from the specification and claims, as will obvious modifications of the single embodiment shown in the drawings, in which:

FIG. 1 is a side elevation view of the rear portion of a bottle washer provided with a bottle handling apparatus embodying the present invention;

FIGS. 2 and 3 are fragmentary side elevation views of the bottle handling apparatus shown in FIG. 1 (as viewed from the opposite side);

FIG. 4 is a view taken along line 4—4 of FIG. 3;

FIG. 5 is a sectional view taken along line 5—5 of FIG. 2;

FIG. 6 is a sectional view taken along line 6—6 of FIG. 5;

FIG. 7 is a sectional view taken along line 7—7 of FIG. 5;

FIG. 8 is a sectional view taken along line 8—8 of FIG. 1;

Figure 9:
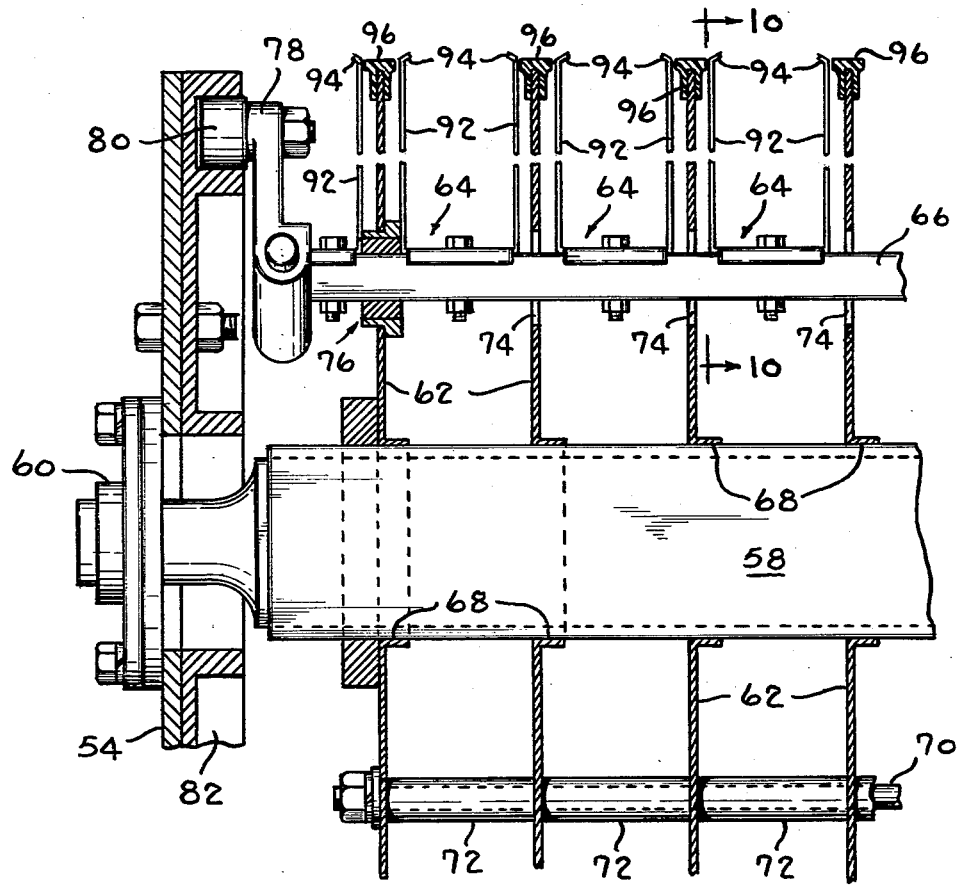
FIG. 9 is a sectional view taken along line 9—9 of FIG. 6 with certain parts broken away.

While the bottle handling apparatus shown in the drawings and described herein is specifically designed for unloading bottles from a bottle washer it should be understood that it could be adapted with slight modification to other applications such as loading bottles into a washer for example.

Referring to the drawings, FIG. 1 shows the rotary unloader mechanism of this invention mounted at the discharge end of a bottle washer 10. The bottle washer 10 may be of any conventional design. The particular construction of such bottle washer as such is not a part of this invention and thus such structure will not be disclosed in detail herein. In bottle washers and similar bottle conditioning apparatus bottles 12 (FIG. 6) are loaded into carriers 14 supported by an endless carrier chain adapted for movement through the various stages in the washer from the loading end where the bottles are loaded into the carriers to the discharge end where they are unloaded therefrom by the apparatus presently to be described. Carriers 14 are arranged in tandem relation in banks of up to 40 carriers per bank and are adapted to advance the bottles bank-by-bank into an ejection position designated by the numeral 16 (FIGS. 2 and 6).

The unloading apparatus of this invention is supported on the discharge end of washer 10 (FIGS. 2 and 6) by a pair of side frames 18 bolted to the washer and having a transverse I-beam 20 supported therefrom. A bottle discharge conveyor chain 22 of conventional design is movably mounted on the top of I-beam support 20. The unloader mechanism is pivotally supported on I-beam 20 by means of a support shaft 24 and includes a bottle guide assembly and a bottle transfer assembly designated generally by numerals 26 and 28. A stationary bottle slide plate 30 having transverse notches 32 therein (FIG. 7) is mounted adjacent conveyor 22 and adapted to receive bottles deposited thereon by the unloader mechanism as will presently be explained.

As shown in FIGS. 3 and 4, bottles 12 are ejected from the carriers (one bank at a time) by means of a row of knockout fingers 34 pivotally mounted at the end of a knockout lever 36. Lever 36 is reciprocated by an actuating rod 38 and fingers 34 are properly positioned during actuation by a knockout slide link 40 which rides in sliding engagement with a slide angle guide 42.

When bottles 12 reach ejection station 16 they are disposed in a substantially horizontal position (about an 18 degree angle with the horizontal). Thus, it is seen that neither prior to ejection nor when ejected do bottles 12 assume a substantially upright position and therefore there is no possibility of water or other material falling into the open ends of the bottles from the bottles on the carrier chain above. When lever 36 is actuated, a bank of bottles will be ejected by the positive engagement of fingers 34 with the bottles themselves and thus the danger of bottles sticking in the carriers is substantially eliminated.

Figure 15:
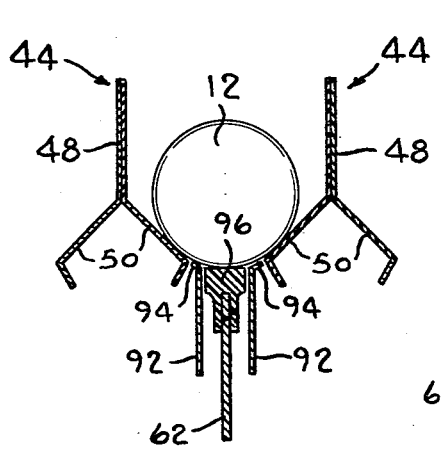
FIG. 15 is a sectional view taken along line 15—15 of FIG. 11.

Each bank of bottles so ejected will be received by guide assembly 26 and deposited smoothly and rapidly on plate 30 by bottle transfer assembly 28. Guide assembly 26 (FIGS. 5, 6, 7 and 15) includes a plurality of curved bottle slides 44 having hubs 46 at one end thereof for pivotally mounting the slides in a spaced row along support shaft 24. Slides 44 (FIG. 15) have a vertical center portion 48 and a pair of leg portions 50 which angle outwardly therefrom and which cooperate with the next adjacent slides to form V-shaped bottle guides for the bottles ejected from the carriers. The upper ends of slides 44 adjacent the ejection station 16 are supported on a plate 52 fastened between drive shaft bearing plates 54 and 56 pivotally mounted on support rod 24 at each end thereof.

Bottle transfer assembly 28 (FIG. 9) is rotatably supported on a square drive shaft 58 journaled in bearings 60 mounted in plates 54 and 56. Assembly 28 includes a plurality of bottle push-off cams 62 mounted on drive shaft 58 for rotation therewith and a plurality of bottle tilter fingers 64 (three to a cam) mounted on three square tilter finger shafts 66 and adapted for pivotal movement with respect to the cams. Cams 62 have square openings 68 therein to insure proper register with the square shaft. Tie rods 70 and spacer tubes 72 are provided to accurately space the cams and tie them together to form a unitary cam bank.

The tilter finger shafts extend through aligned openings 74 in cams 62 which are equally angularly arranged around drive shaft 58. The shafts 66 are rotatably mounted in such openings by means of bearings 76 mounted in the end and center cams.

Tilter finger shafts 66 are actuated by cam levers 78 mounted on the end of each shaft and having cam followers 80 rotatably mounted thereon in engagement with a tilter finger cam 82 mounted on bearing plate 54.

As shown in FIG. 5, bottle push-off cams 62 are positioned for rotation in the spaces between bottle slides 44 so that the bottles ejected onto the guide assembly 26 can be engaged by the cam assembly and transferred to conveyor 22 in a manner to be explained in detail hereinafter. Cams 62 (FIGS. 11–14) are provided with three bottle handling lobes 84 formed by a radially extending bottle support face 86 and a smoothly curved bottle push-off face 88 which in cooperation with the tilter fingers 64 function to transfer three banks or rows of bottles from the carriers to the conveyor for each complete revolution of the cam assembly.

Figure 10:
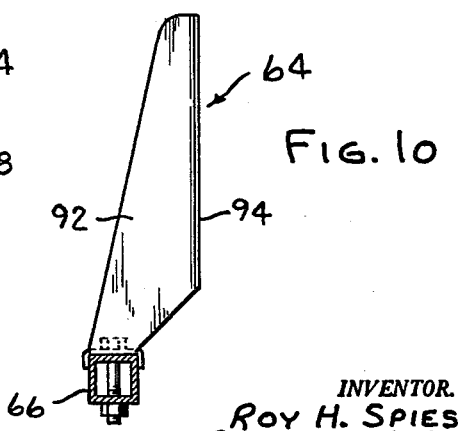
FIG. 10 is a sectional view taken along line 10—10 of FIG. 9.

Bottle tilter fingers 64 (FIGS. 9 and 10) comprise a base portion 90 for mounting on shaft 66 and a pair of upright finger portions 92 which lie substantially flush with adjacent cams 62. The edges 94 of finger portions 92 are bent slightly (FIG. 15) to adapt the fingers for engagement with a bottle ejected onto bottle slides 44. The finger portion 92 of one tilter finger 64 combines with the finger portion of the next adjacent tilter finger to support and steady a bottle as it is moved from its horizontal ejection position to an upright position for deposit on bottle slide plate 30, as will be explained in detail hereinafter.

While the various parts of the bottle guide assembly 26 and bottle transfer cam assembly 28 described above can be made from any suitable material, in the preferred embodiment bottle slides 44 and tilter fingers 64 are made of stainless steel and cams 62 are made of aluminum with a wear strip 96 of black nylon. Drive shaft 58 and tilter finger shaft 66 are also made of aluminum to keep the weight to a minimum.

As shown in FIG. 1, the cam assembly 28 is rotated as a unit by a chain drive 98 driven from the main washer drive and connected to the cam assembly by means of a sprocket 100 mounted on one end of drive shaft 58. The entire unloader mechanism can be pivoted downwardly about shaft 24 when necessary to free a bottle jam, for example, by depressing a treadle bar 102 pivotally mounted at the bottom of the washer and operatively connected to bearing plates 54 and 56 by treadle rods 104. A pivotally mounted idler sprocket 106 having a weight 108 is provided to maintain chain 98 in proper engagement with drive sprocket 100 when the treadle is depressed for any reason. A safety switch device (not shown) is provided to automatically shut down the main washer drive if treadle 102 is depressed. A counterweight mechanism 110 (FIGS. 1 and 8) including a weight 112 pivotally mounted on stub shafts 114 and operatively connected to bearing plates 54 and 56 by rods 116 is provided to return the unloader mechanism to operating position (defined by adjustable stops 118) each time treadle 108 is depressed. A further safety feature is provided by guide rail 120 (FIG. 1) pivotally mounted on end frames 18 and adapted when pivoted to actuate a switch 122 and thereby shut down the washer. Guide rail 120 also serves to prevent bottles from being pushed off the end of the receiving platform and will be pivoted automatically if bottle accumulation thereon becomes great enough.

*Operation*

The movement of the carrier chain is synchronized with the reciprocating knockout fingers 34 so that when a bank of bottles moves into the ejection station 16, fingers 34 will be actuated by lever 36 to push the bottles from the carriers onto the V-shaped guides formed by adjacent bottle slide elements 44 of guide assembly 26. Similarly, the rotation of bottle transfer cam assembly 28 is synchronized with the actuation of the knockout fingers so that as each bottle is ejected onto the guide assembly the continuously rotating cams 62 will be properly positioned to receive the bottle.

Figure 11:
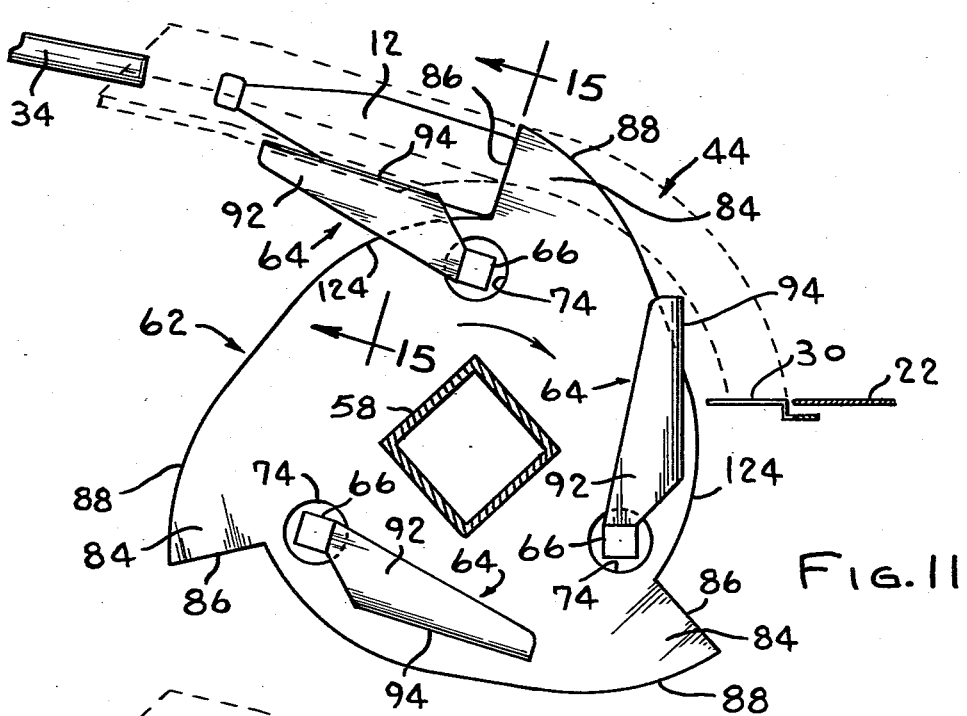
FIGS. 11, 12, 13 and 14 are partially schematic views of the apparatus showing the sequence of operation.

Referring now to FIGS. 11–14, as a bottle 12 is ejected from a carrier onto the guide assembly the bottle will be pushed by finger 34 into the position shown in FIG. 11 wherein the bottom of the bottle will engage a bottle support face 86 of cam 62 while at the same time a pair of support edges 94 of a pair of adjacent bottle tilter fingers 64 will engage the side of the bottle. In the FIG. 11 position the tilter finger cam 82 has positioned the tilter fingers engaging the bottle so that edges 94 will extend at right angles with the bottle support face 86 which engages the bottom of the bottle. As cam 62 is rotated clockwise (as shown by the arrow) from the position shown in FIG. 11 to that shown in FIG. 12, the right angle relationship between edges 94 and face 86 will be maintained to thereby smoothly tilt the bottle from its substantially horizontal ejection position to an upright position for deposit on horizontal bottle slide plate 30. It will be noted that during this bottle tilting movement the bottles do not normally contact slide elements 44, however, the bottom portions of the bottles remain between vertical sections 48 of adjacent bottle slide elements 44 to thereby insure bottle stability at all times.

As cam 62 continues to rotate, bottle push-off cam face 88 of the cam will engage the bottle (through notches 32 in the bottle slide plate) and push it horizontally from the bottle slide plate onto discharge conveyor chain 22. Cam face 88 is formed as at 124 (FIG. 12) so that there will be a short dwell time after the bottle is deposited on the slide plate and before it is pushed off of it to thereby allow the bottle to come completely to rest in case it might be rocking slightly upon initial deposit on the horizontal surface. As the bottles are pushed by faces 88, vertical side sections 48 of the bottle guide means serve to steady the bottles to keep them moving at right angles to the conveyor movement until they are completely on the chain.

Figure 12:
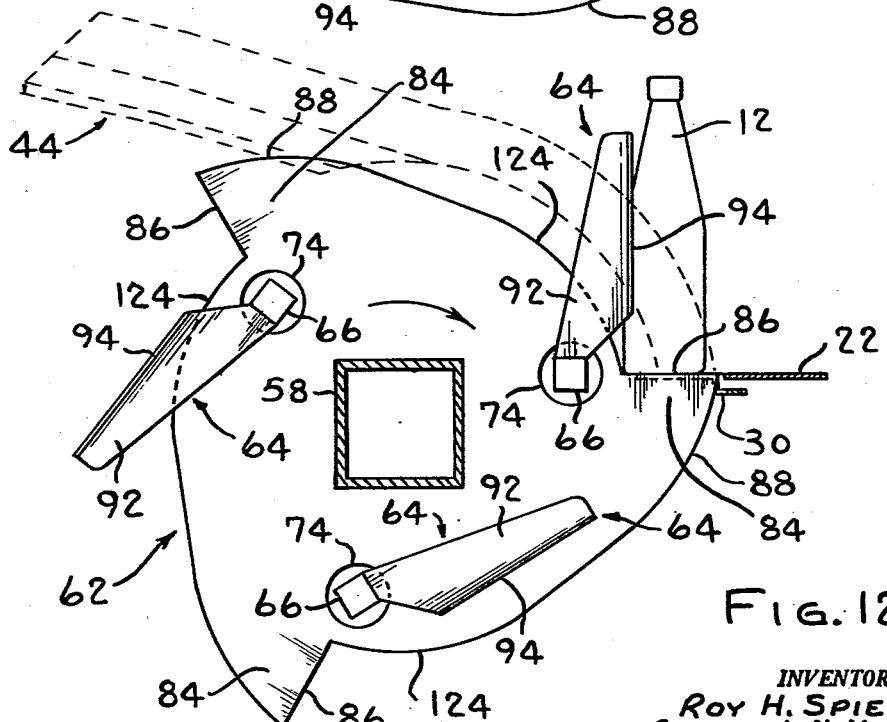
Figure 13:
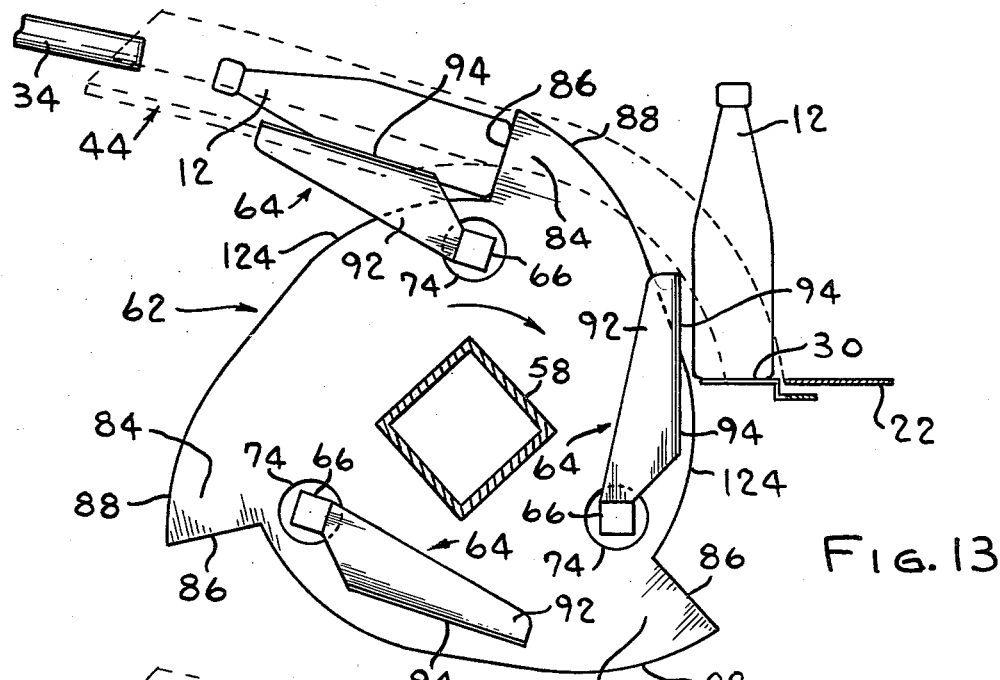
Figure 14:
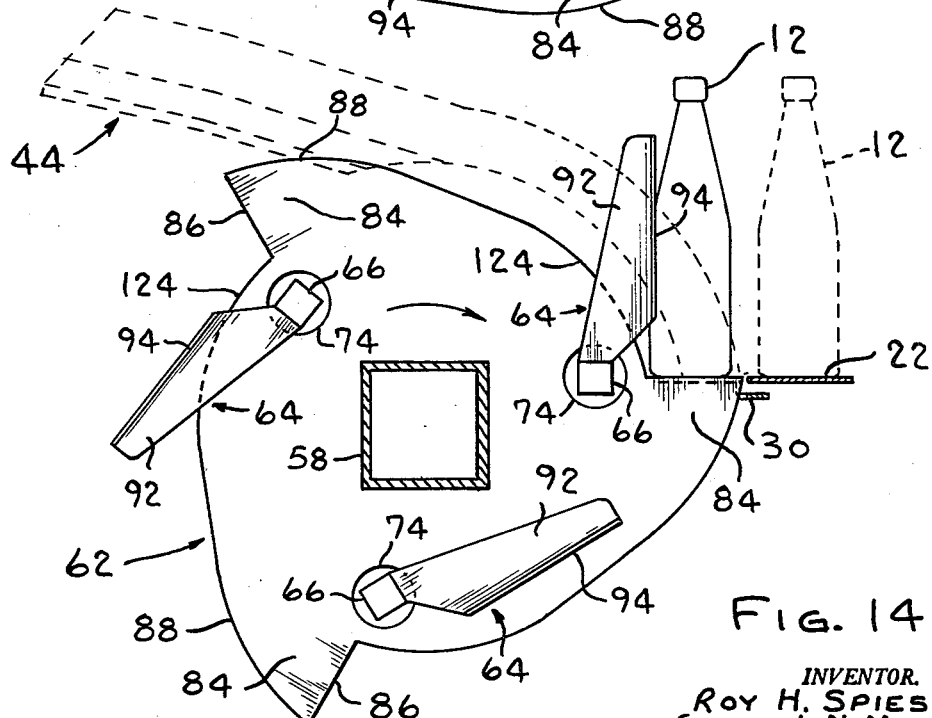

It will also be appreciated that as cam 62 rotates from the position shown in FIG. 12 through that shown in FIG. 13 and then to that shown in FIG. 14, it is necessary to pivot tilter finger 64 with respect to cam 62 to prevent interference between the tilter finger and the bottle deposited on plate 30. This is accomplished by designing tilter finger cam 82 to actuate tilter finger lever 78 and thereby rotate the tilter finger (clockwise with respect to the cam) from the right angle position shown in FIGS. 11 and 12 to the position shown in FIG. 14. The rate of tilter finger rotation is such that as the finger moves downwardly past the bottle on slide plate 30 the edges 94 of the tilter fingers will remain at substantially right angles to the slide plate and thereby provide an upright back support for the bottle in case the bottle would, for any reason, be tipped backwards during the dwell period between deposit on plate 30 and engagement by push-off surface 88. After the tilter finger has been rotated out of the way it is again rotated back to its right angle relationship with respect to its cooperating cam support surface 86 as the cam makes a complete revolution back to its original bottle receiving position (FIG. 11).

It will be appreciated that cam 62 could operate with just one cam support surface 86 and tilter finger 64 but due to the particular design characteristics of the cam and tilter finger described above it is possible to provide a single cam with a plurality of bottle handling lobes 84 and thus handle more than one bank or row of bottles in a single cam revolution. This means that for any given number of bottles handled per minute the rotation of the cam bank can be substantially reduced as compared with a cam which is capable of handling only one bottle per revolution. This is a substantial advantage because the slower the cams are rotated the smoother and more trouble-free is the operation which results.

Although but one embodiment of the present invention has been illustrated and described, it will be apparent to those skilled in the art that various changes and modifications may be made therein without departing from the spirit of the invention or from the scope of the appended claims.

We claim:
1. Bottle handling apparatus for unloading rows of bottles from a bottle washer and depositing the rows on a horizontal surface comprising, a plurality of rotatable cam members, a plurality of cooperating pairs of first and second support faces on each of said cam members adapted to engage the bottom and side of a bottle respectively, each of said cooperating pairs of first and second support faces adapted to carry a bottle as said cam members are rotated to thereby unload a plurality of rows from the washer and deposit them on a horizontal surface for each revolution of said cam members.

2. Bottle handling apparatus for unloading rows of bottles from a bottle washer and depositing the rows on a horizontal surface comprising, a plurality of rotatable cam members, a plurality of cooperating pairs of first and second support faces on each of said cam members adapted to engage the bottom and side of a bottle respectively, each of said cooperating pairs of first and second support faces adapted to carry a bottle as said cam members are rotated to thereby unload a plurality of rows from the washer and deposit them on a horizontal surface for each revolution of said cam members, said second support faces adapted for movement with respect to said first support faces to prevent interference between said second support faces and the bottles as said cam members continue to rotate after a row of bottles is deposited on the horizontal surface.

3. Bottle handling apparatus comprising, a rotatable cam member, a bottle support face on said cam member, a bottle support member pivotally mounted on said cam member, said bottle support face and member adapted to engage the bottom and side of a bottle respectively to thereby carry a bottle angularly from one position to another as said cam member is rotated.

4. Bottle handling apparatus for receiving a bottle from a bottle washer and depositing it on a horizontal surface comprising, a rotatable cam member, a bottle support face on said cam member, a bottle support member pivotally mounted on said cam member and adapted for movement with respect to said bottle support face, said bottle support face and bottle support member adapted to engage the bottom and side of a bottle respectively to thereby carry a bottle from the washer to a horizontal surface as said cam member is rotated, means for pivoting said support member with respect to said bottle support face to prevent interference between said bottle support member and the bottle after the bottle is deposited on a horizontal surface.

5. Bottle handling apparatus for receiving a bottle from a bottle washer and depositing it on a horizontal surface comprising, a rotatable cam member, a bottle support face on said cam member, a bottle support member pivotally mounted on said cam member for movement with respect to said bottle support face, a bottle push-off face on said cam member, said bottle support face and bottle support member adapted to engage the bottom and side of a bottle respectively to thereby carry a bottle from the washer to a horizontal surface as said cam member is rotated, means for pivoting said bottle support member with respect to said bottle support face after the bottle is deposited on a horizontal surface to thereby prevent interference between said bottle support member and the bottle as the member continues to rotate, said bottle push-off surface adapted to engage the bottle after it is deposited on a horizontal surface and to push it away from said cam member as said cam member continues to rotate.

6. Bottle handling apparatus comprising, bottle guide means adapted to receive a bottle in a substantially horizontal position, bottle transfer means adapted to engage a bottle on said guide means and deposit it in an upright position on a horizontal surface, said bottle transfer means including a rotatable cam member having a bottle support face thereon and a bottle support member pivotally mounted adjacent thereto, said bottle support face and member adapted to engage the bottom and side of a bottle respectively to thereby support and steady the bottle as it is transferred along said guide means for deposit on a horizontal surface.

7. Bottle handling apparatus according to claim 6 in which there are a plurality of cooperating support faces and members on said cam member each adapted to transfer a bottle along said guide means and deposit it on a horizontal surface.

8. Bottle handling apparatus according to claim 6 in which said cam member has a bottle push-off face formed thereon adapted to engage a bottle after deposit on a horizontal surface and push it horizontally along the surface.

9. Bottle handling apparatus according to claim 8 in which said bottle push-off face is adapted to provide a dwell time for the bottle after it is deposited on the horizontal surface and before it is engaged by said push-off face.

10. Bottle handling apparatus according to claim 6 in which said bottle transfer means further includes a stationary support member cam and a support member shaft on which said support member is mounted, said support member cam adapted to rotate said support member shaft as said cam member is rotated to maintain the proper relative position between said support member and said bottle support face.

11. Bottle handling apparatus according to claim 10 in which said support member cam is adapted to maintain an angle of approximately 90 degrees between said member and said support face while the bottle is being transferred along said guide means to the horizontal surface.

12. Bottle handling apparatus according to claim 6 in which bottle guide means includes a plurality of spaced bottle slide elements adapted to form a V-shaped trough adapted to receive a bottle in substantially horizontal position and steady it as it is transferred to the horizontal surface.

13. Bottle handling apparatus for unloading rows of bottles from the carrier of a bottle washer onto a discharge conveyor comprising, bottle guide means adapted to receive a row of bottles in substantially horizontal position from the carriers of the bottle washer, a horizontal bottle slide plate located between said bottle guide means and the discharge conveyor, bottle transfer means adapted to engage a row of bottles on said guide means and deposit them in an upright position on said slide plate, said bottle transfer means including a plurality of rotatable cam members each having a bottle support face and a push-off face formed thereon, a bottle support member pivotally mounted adjacent each of said cam members, said bottle support face and support member of each cam adapted to engage the bottom and side of a bottle respectively, to thereby support and steady the bottle as it is transferred along said guide means for deposit on said slide plate, said bottle push-off face on each cam adapted to engage a bottle after it has been deposited on said slide plate and push it horizontally from said plate towards said discharge conveyor.

14. Bottle handling apparatus according to claim 13 in which there are three cooperating support faces and members on each of said rotatable cam members, each of said support faces and members adapted to transfer a bottle along said guide means and deposit it on said slide plate.

15. Bottle handling apparatus according to claim 13 in which said bottle push-off face formed on each of said rotatable cam members is adapted to provide a dwell time for the bottle after it is deposited on said slide plate and before it is engaged by said push-off face.

16. Bottle handling apparatus according to claim 13 in which said bottle transfer means further includes a stationary support member cam and a support member shaft extending through openings in said rotatable cams on which said support members are mounted, said support member cam adapted to rotate said support member shaft as said cam members are rotated to thereby maintain the desired relative position between said support members and said bottle support faces.

17. Bottle handling apparatus according to claim 16 in which said support member cam is adapted to maintain an angle of approximately 90 degrees between said support members and said support faces while a row of bottles is being transferred along said guide means to said slide plate.

18. Bottle handling apparatus comprising, bottle guide means adapted to receive a bottle in a substantially horizontal position, bottle transfer means adapted to engage a bottle on said guide means and deposit it in an upright position on a horizontal surface, said bottle transfer means including a rotatable member having a support face thereon adapted for engagement with the bottom of a bottle and a support member pivotally mounted thereon adapted for engagement with the side of a bottle, said support face and member adapted to support and steady a bottle as said member is rotated to transfer the bottle along said guide means for deposit on a horizontal surface, means for pivoting said support member with respect to said support face after the bottle is deposited on a horizontal surface to thereby prevent interference between said support member and the bottle as said member continues to rotate.

19. Bottle handling apparatus for unloading rows of bottles from a bottle washer and depositing the rows on a horizontal surface comprising, a plurality of rotatable cam members arranged side-by-side, three bottle carrying lobes on each of said cam members adapted to unload three rows of bottles from a bottle washer for each revolution of said cam members, bottle supporting means on each of said lobes adapted to receive a bottle in substantially horizontal position with the top of the bottle tilted up slightly and to carry the bottle to a horizontal surface and deposit it on such surface with the bottle in a vertical position, and means for continuously rotating said cam members at a uniform speed.

References Cited in the file of this patent

UNITED STATES PATENTS

| | | |
|---|---|---|
| 2,128,192 | Risser | Aug. 23, 1938 |
| 2,497,767 | Hallead | Feb. 12, 1950 |
| 2,738,866 | Vamvakas | Mar. 20, 1956 |